United States Patent
Thirumalai et al.

(10) Patent No.: US 9,848,193 B2
(45) Date of Patent: Dec. 19, 2017

(54) SYSTEM AND METHOD FOR SELECTING QUANTIZATION PARAMETER (QP) IN DISPLAY STREAM COMPRESSION (DSC)

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 14/685,430

(22) Filed: Apr. 13, 2015

(65) Prior Publication Data

US 2015/0296206 A1  Oct. 15, 2015

Related U.S. Application Data

(60) Provisional application No. 61/979,868, filed on Apr. 15, 2014, provisional application No. 62/034,680, filed on Aug. 7, 2014.

(51) Int. Cl.
| | |
|---|---|
| *H04N 19/00* | (2014.01) |
| *H04N 19/124* | (2014.01) |
| *H04N 19/174* | (2014.01) |
| *H04N 19/15* | (2014.01) |
| *H04N 19/152* | (2014.01) |

(Continued)

(52) U.S. Cl.
CPC ........... *H04N 19/124* (2014.11); *H04N 19/15* (2014.11); *H04N 19/152* (2014.11); *H04N 19/174* (2014.11); *H04N 19/176* (2014.11); *H04N 19/423* (2014.11)

(58) Field of Classification Search
CPC ..... H04N 19/124; H04N 19/15; H04N 19/152
USPC ..................................................... 375/240.05
See application file for complete search history.

(56) References Cited

U.S. PATENT DOCUMENTS

2002/0181583 A1* 12/2002 Corbera ............... H04N 19/176
375/240.03
2009/0103609 A1*  4/2009 Jiang .................... H04N 19/152
375/240.03

(Continued)

FOREIGN PATENT DOCUMENTS

WO   WO-2008070987 A1   6/2008

OTHER PUBLICATIONS

International Search Report and Written Opinion—PCT/US2015/025742—ISA/EPO—Jan. 12, 2016.

(Continued)

*Primary Examiner* — Jeffery Williams
(74) *Attorney, Agent, or Firm* — Knobbe, Martens, Olson & Bear, LLP

(57) ABSTRACT

An apparatus for coding video data according to certain aspects includes a memory for storing the video data and a processor. The memory includes a buffer. The processor is configured to receive the video data to be coded. The processor is further configured to determine a quantization parameter (QP) of a current block of the video data without considering a type of content of the video data and a rate-distortion model associated with the type of content. The processor is also configured to code the current block in a bitstream using the determined QP.

26 Claims, 5 Drawing Sheets

(51) Int. Cl.
    *H04N 19/176*     (2014.01)
    *H04N 19/423*     (2014.01)

(56) References Cited

U.S. PATENT DOCUMENTS

| | | | |
|---|---|---|---|
| 2010/0124279 A1* | 5/2010 | Reddy | H04N 19/126 375/240.16 |
| 2014/0092957 A1 | 4/2014 | Macinnis | |

OTHER PUBLICATIONS

Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].

Walls F., et al., "VESA Display Stream Compression", Mar. 3, 2014 (Mar. 3, 2014), pp. 1-5, XP002751573, Retrieved from the Internet: URL: http ://www.vesa.org/wp-content/uploads/2014/04/VESA_DSC-ETP200.pdf [retrieved on—Nov. 27, 2015].

* cited by examiner

SYSTEM AND METHOD FOR SELECTING QUANTIZATION PARAMETER (QP) IN DISPLAY STREAM COMPRESSION (DSC)

INCORPORATION BY REFERENCE TO PRIORITY APPLICATIONS

This application claims the benefit of U.S. Provisional Application No. 61/979,868, filed Apr. 15, 2014, and U.S. Provisional Application No. 62/034,680, filed Aug. 7, 2014, each of which is incorporated by reference in its entirety. Any and all applications for which a foreign or domestic priority claim is identified in the Application Data Sheet as filed with the present application are hereby incorporated by reference under 37 CFR 1.57.

TECHNICAL FIELD

This disclosure relates to the field of video coding and compression, and particularly to video compression for transmission over display links, such as display stream compression (DSC).

BACKGROUND

Description of the Related Art

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., good enough that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, an apparatus for coding video data includes a memory for storing the video data and a processor. The memory includes a buffer. The processor is configured to receive the video data to be coded. The processor is further configured to determine a quantization parameter (QP) of a current block of the video data without considering a type of content of the video data and a rate-distortion model associated with the type of content. The processor is also configured to code the current block in a bitstream using the determined QP.

DETAILED DESCRIPTION

Figure 1A:
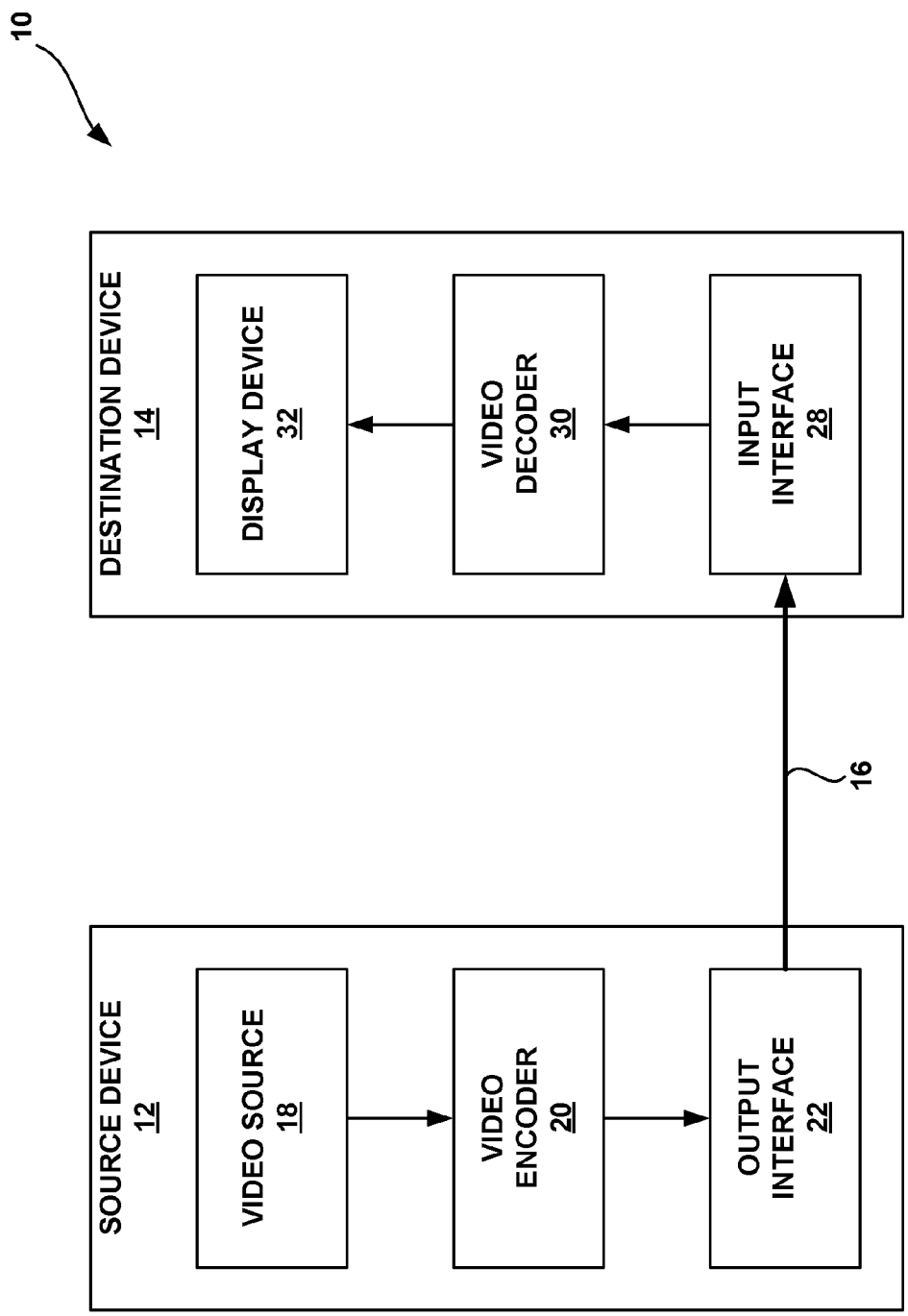
FIG. 1A is a block diagram illustrating an example video encoding and decoding system that may utilize techniques in accordance with aspects described in this disclosure.

In general, this disclosure relates to techniques for selecting a quantization parameter (QP) in the context of video compression techniques, such as display stream compression (DSC). More specifically, the present disclosure relates to systems and methods for calculating the QP without considering a rate distortion model (e.g., calculating (or determining) the QP without the utilization of a rate distortion model to perform the calculation (or determination)).

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and High Efficiency Video Coding (HEVC), and extensions of such standards. Also, the techniques described in this disclosure may become part of standards developed in the future. In other words, the techniques described in this disclosure may be applicable to previously developed video coding standards, video coding standards currently under development, and forthcoming video coding standards.

Calculating QP can be a desirable step in the rate control process and can have a great influence on the rate-distortion (RD) performance of the coding scheme. In one embodiment, QP is selected to optimize the rate-distortion relationship that requires an empirical rate-distortion model. For example, the QP may be calculated to best fit a given rate-distortion empirical model. This approach may work well when working with particular content, e.g., natural content. However, when working with several types of contents that include natural, synthetic, computer graphics, fractals, etc., it may be challenging to establish a rate-distortion model that works efficiently for different types of content. For example, it can be challenging to establish a single closed form expression for the rate-distortion model.

To overcome this challenge, it may be desirable to implement a method to calculate QP that does not require knowledge of or depend on the rate-distortion model.

In order to address these and other challenges, the techniques according to certain aspects can determine an optimal QP without considering a rate-distortion model. A rate-distortion model can be associated with one or more coding modes in DSC or one or more different types of content. Rate-distortion models may be based on empirical data. In one embodiment, the techniques can determine the QP based on (1) the difference between the bit budget (e.g., allocated number of bits for coding) for the current block and the number of bits for encoding the previous block and (2) a QP adjustment value that is a function of the difference between the bit budget for the current block and the number of bits for encoding the previous block. The determined QP for the current block may be further adjusted based on the buffer fullness, the flatness of the current block, etc.

In this manner, the techniques can select a QP value without relying on a specific rate-distortion model associated with a coding mode or a particular type of content. This can save costs and/or resources since establishing a rate-distortion can be time consuming and involve a significant amount of effort. In addition, the techniques can determine a QP that works well with different types of contents.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
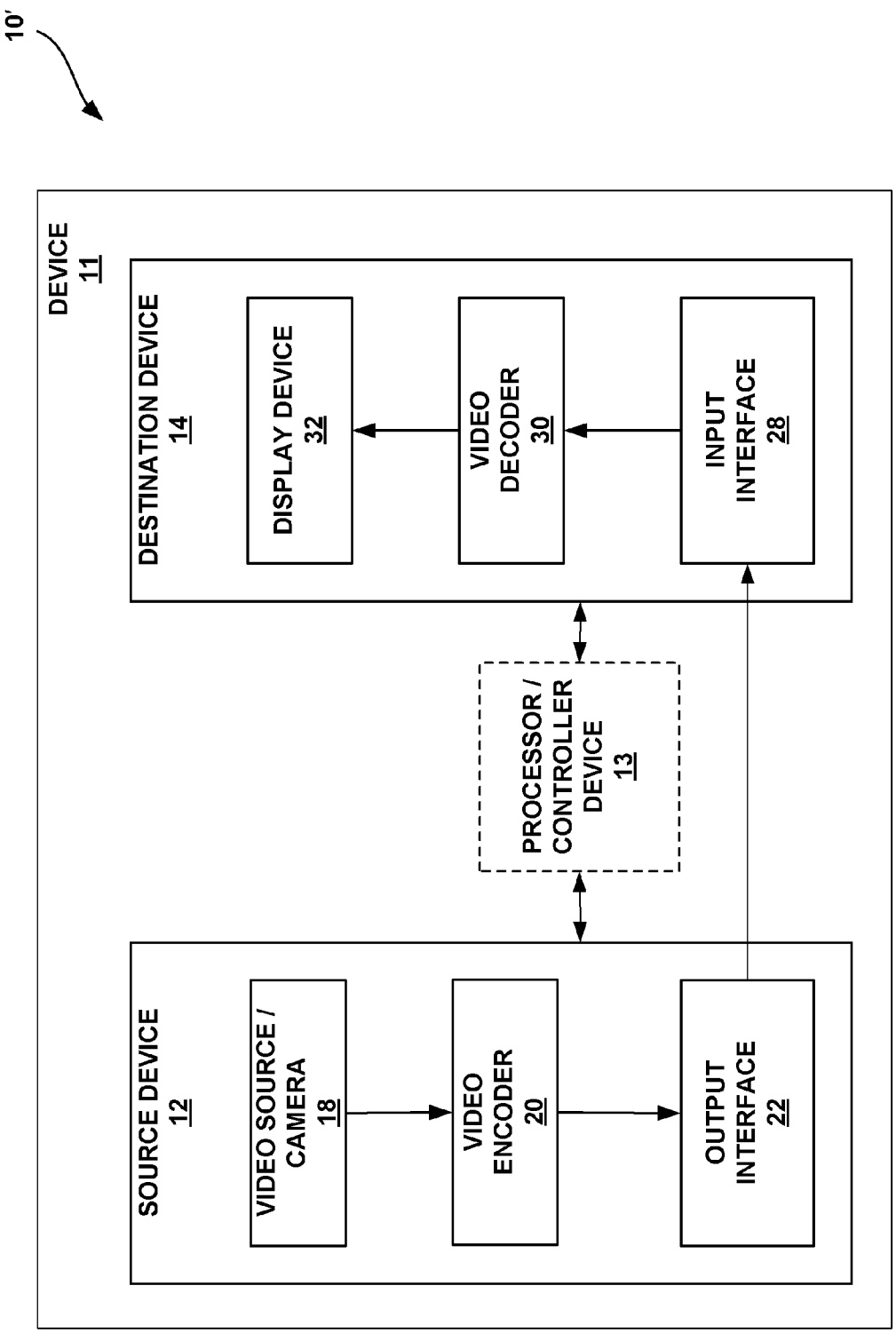
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or it may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
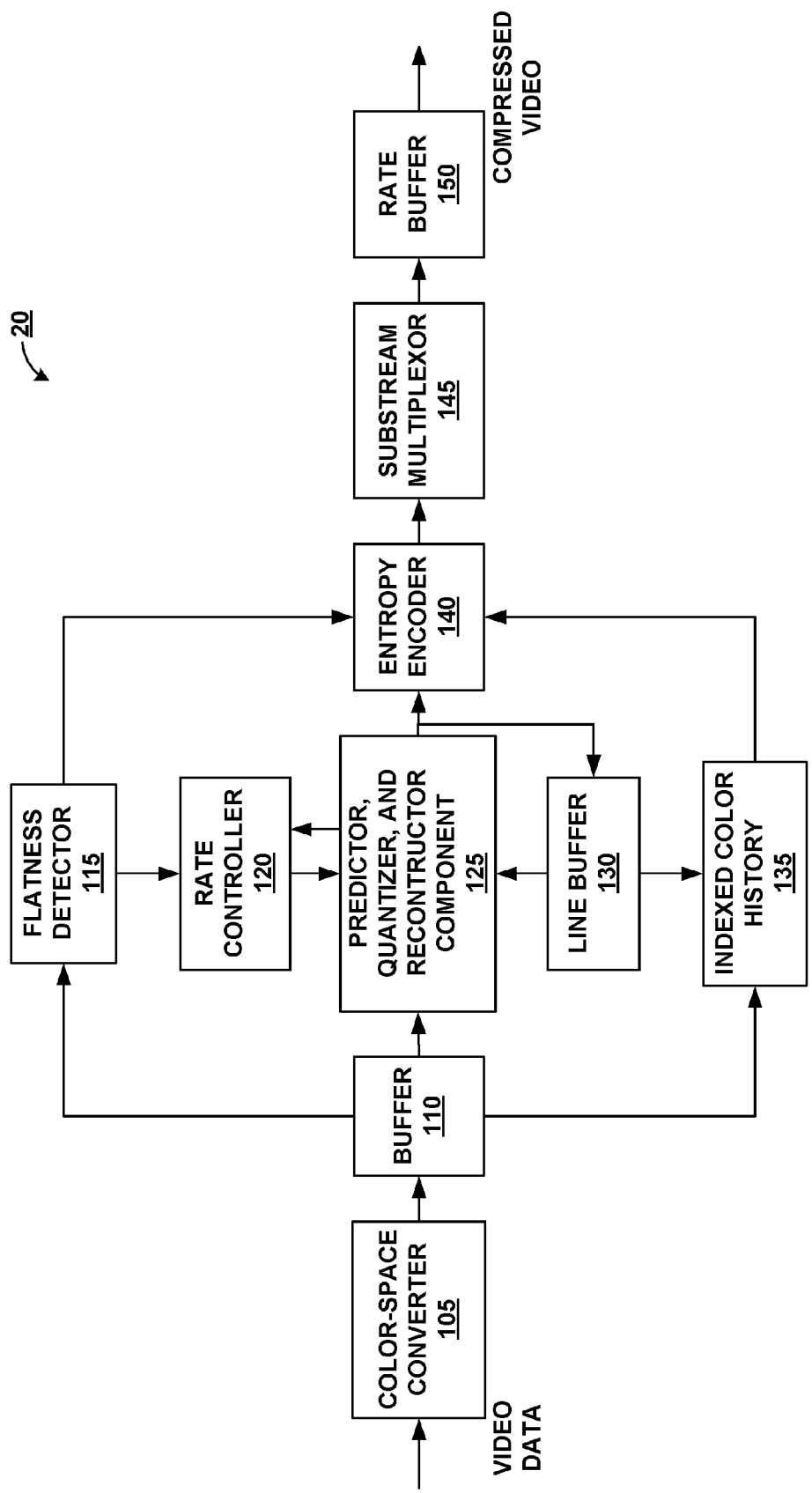
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term "complex" as used herein generally describes a region of the video data as being complex or difficult for the video encoder 20 to encode and may, for example, include textured video data, high spatial frequency, and/or other features which are complex to encode. For example, a region of the video data may be determined to be a complex region when the number of bits required to encode the region are greater than a threshold. The term "flat" as used herein generally describes a region of the video data as being simple for the video encoder 20 to encoder and may, for example, include a smooth gradient in the video data, low spatial frequency, and/or other features which are simple to encode. For example, a region of the video data may be determined to be a flat region when the number of bits required to encode the region are less than the threshold.

However, depending on the implementation, the determination of whether a given region is complex or flat may also be determined based on the encoding standard used, the specific hardware included in the video encoder 20, the type of video data to be encoded, etc. Further, certain properties of the video data regions may influence how many bits are required to encode the region, for example, high texture and/or high spatial frequency regions may require more bits to be encoded than lower texture and/or lower spatial frequency regions. Similarly, regions comprising random noise may be require a large number of bits to be encoded compared to more structured regions of the video data. Thus, in certain implementations, regions of the video data may be identified as complex and/or flat regions by comparing a measure of the texture and/or spatial frequency (e.g., a complexity value) to a complexity threshold. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels to the left. The video encoder 20 and the video decoder 30 can both perform an identical search on reconstructed pixels to determine the block prediction usages, and thus, no bits need to be sent in the block prediction mode. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
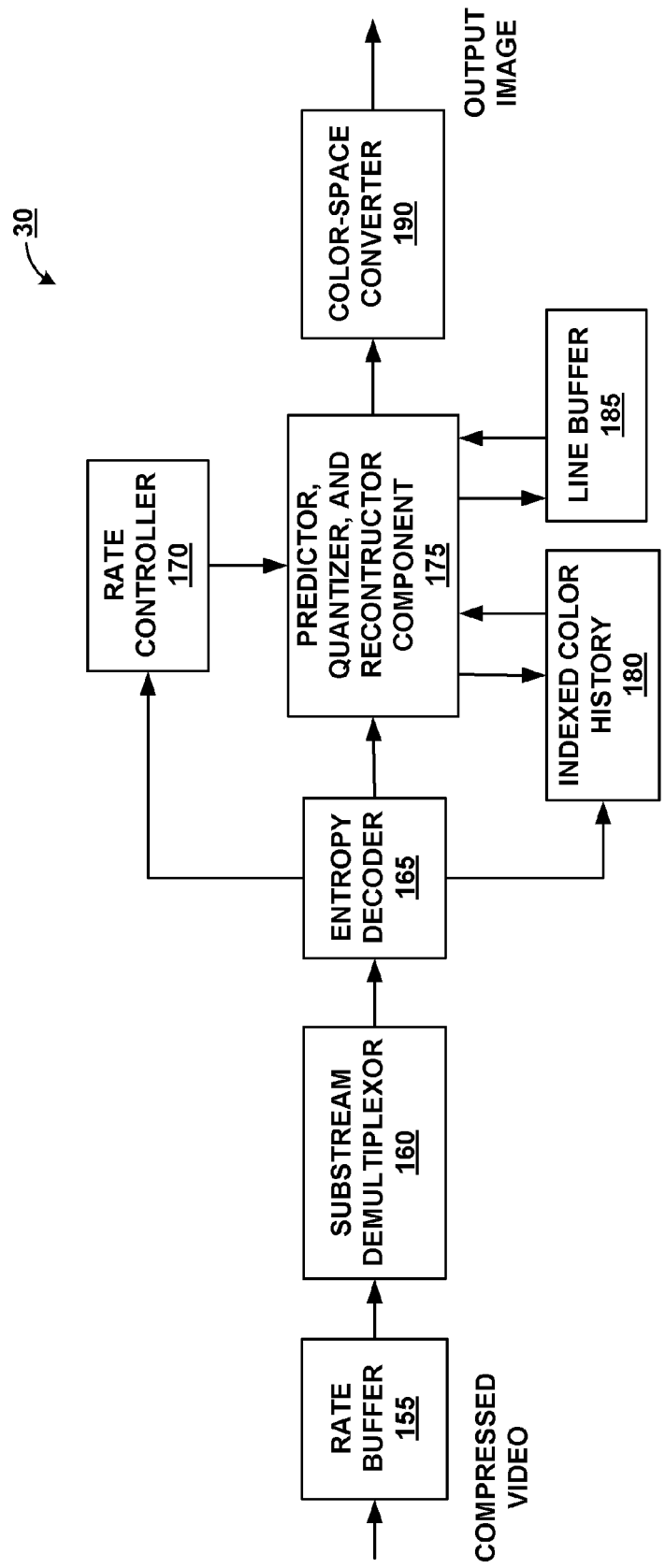
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video encoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or it may be encoded in several slices. In DSC, the target bits allocated to encode each slice may be substantially constant.

Selecting QP for DSC

Calculating QP can be a desirable step in the rate control process and can have a great influence on the rate-distortion (RD) performance of the coding scheme. In one embodiment, QP is selected to optimize the rate-distortion relationship that requires an empirical rate-distortion model. For example, the QP may be calculated to best fit a given rate-distortion empirical model. This approach may work well when working with particular content, e.g., natural content. However, when working with several types of contents that include natural, synthetic, computer graphics, fractals, etc., it may be challenging to establish a rate-distortion model that works efficiently for different types of content. For example, it can be challenging to establish a single closed form expression for the rate-distortion model. To overcome this challenge, it may be desirable to implement a method to calculate QP that does not require knowledge of or depend on the rate-distortion model.

In order to address these and other challenges, the techniques according to certain aspects can determine an optimal QP without considering a rate-distortion model. A rate-distortion model can be associated with one or more coding modes in DSC or one or more different types of content. Rate-distortion models may be based on empirical data. In one embodiment, the techniques can determine the QP based on (1) the difference between the bit budget for the current block and the number of bits for encoding the previous block and (2) a QP adjustment value that is a function of the difference between the bit budget for the current block and the number of bits for encoding the previous block. The determined QP for the current block may be further adjusted based on the buffer fullness, the flatness of the current block, etc.

In this manner, the techniques can select a QP value without relying on a specific rate-distortion model associated with a coding mode or a particular type of content. This can save costs and/or resources since establishing a rate-distortion can be time consuming and involve a significant amount of effort. In addition, the techniques can determine a QP that works well with different types of contents.

Certain details relating to selecting the QP in DSC are explained below, for example, in connection with the example embodiment. Various terms used throughout this disclosure are broad terms having their ordinary meaning. In some embodiments, the QP can refer to a parameter used in the quantization process to control the degree of quantization. For example, the quantization process quantizes the residual to further reduce bit rate. The quantization process may reduce the bit depth associated with some or all of the residuals. The degree of quantization may be modified by adjusting the quantization parameter. For instance, the quantization parameter is used for determining the quantization of residuals. When the QP value is low, most of the detailed visual information can be retained. A low QP value generally provides lower distortion, but at the cost of higher bit rate. As the QP value increases, more bit planes may be discarded, which reduces the bit rate, but at the cost of increasing distortion. In certain embodiments, the techniques can determine the QP independently of a rate-distortion model, determine the QP not as a function of a rate-distortion model, etc. According to certain aspects, determining the QP without considering a rate-distortion model may also be referred to as determining the QP independently of a rate-distortion model, determining the QP not as a function of a rate-distortion model, etc. A rate-distortion model may be associated with the type of content of video data to be coded, may be associated with a particular mode, or both. The type of content may be different from the substance of the content. The type of content may include natural content, synthetic content, computer graphics, fractals, etc. A rate-distortion model can be associated with a particular type of content, not with the actual content itself.

Example Embodiment

In one embodiment, an apparatus and method are provided to calculate a QP that works well for different types of content without knowing the empirical rate-distortion model. For a particular coding mode (or option), the corresponding QP value for the current block can be calculated from the steps described below. This technique may be used independently for each coding mode (or option) to calculate the QP associated with that coding mode (or option). For example, for the current block, the QP value can be calculated for each coding mode using the steps described below and tracked, for example, from block to block. In certain embodiments, instead of calculating a QP corresponding to each coding mode, the techniques may calculate a single QP value that can be used to code all coding modes. For instance, the single QP value for the current block can be calculated from the steps described below.

1. Calculate Bit Budget

The bit budget for the current block (denoted here as bitBudget) is calculated by considering the number of bits remaining in the slice (numSliceBitsRemaining), number of pixels to be encoded in the slice (numSlicePixelsRemaining), and the number of pixels in the current block (numPixelsInBlock). In addition, the number of bits in the buffer (e.g., BF) may be considered while calculating bitBudget.

In one example, the bit rate for the current block is calculated by dividing the number of bits remaining in the slice by the number of pixels in the slice that needs to be encoded. Therefore, bitBudget is calculated as:

bitBudget=(numSliceBitsRemaining/numSlicePixelsRemaining)*numPixelsInBlock.

In another example, the bitBudget may be calculated depending on the position of current block within the slice. For example, the bitBudget can be decreased linearly by a rate decBitBudget, where decBitBudget may be calculated depending on the number of blocks encoded in the current slice and total number of blocks in the current slice.

2. Calculate Difference Between Bit Budget and Number of Bits for Encoding Previous Block The difference between the bitBudget and the number of bits required to encode the previous block (denoted as prevBlockBits) for a specific mode is calculated. This difference may be represented as diffBits and may be calculated as diffBits=prevBlockBits −bitBudget. Further, diffBits may be normalized, for example, as diffBits=diffBits/(numPixelsinBlock*targetBitRate).

In some embodiments, when a single QP is to be derived and used for all coding modes, irrespective of the coding mode that was used to code the previous block, the number of bits spent on coding the previous block (denoted as prevBlockBits) is used to calculate diffBits.

3. Determine QP Adjustment Value as a Function of Difference

Let QpAdj represent an adjustment value that is calculated as a function of the absolute value of diffBits calculated in step 2. The function may linearly or non-linearly increase the value of QpAdj, as the absolute value of diffBits increases.

In one example, the absolute value of diffBits may be classified into K+1 ranges using K threshold values. For example, there can be K threshold values (e.g., 1 through K), and consecutive two threshold values can define the start and the end of a range. For example, range 1 can be between 0 and Threshold 1, range 2 can be between Threshold 1 and Threshold 2, and so forth. For K threshold values, there can be K+1 ranges. For each range, there is a specific QpAdj value, where QpAdj value increases as the range increases.

In some embodiments, QpAdj may be calculated as a function of diffBits, without taking the absolute value. The K threshold values [Threshold1, Threshold 2, ... Threshold k] that are used to classify the K+1 ranges and the respective QpAdj value may be different depending on the sign value of the diffBits.

In one example, when diffBits>0, diffBits may be classified into K+1 ranges using K threshold values. For each range, there is a specific QpAdj value, where QpAdj value increases as the range increases. Otherwise, if diffBits<=0, absolute value of diffBits can be classified into J+1 ranges using J threshold values. Also, for each range there is a specific QpAdj value that increases as the range increases.

In one example, when diffBits>=0, diffBits may be classified into K+1 ranges using K threshold values. For each range, there is a specific QpAdj value, where QpAdj value increases as the range increases. Otherwise, if diffBits<0, absolute value of diffBits can be classified into J+1 ranges using J threshold values. Also, for each range there may be a specific QpAdj value that increases as the range increases.

In one example, when diffBits<=0 or diffBits<0, diffBits may be classified into J+1 ranges using J threshold values. Also, for each range there is a specific QpAdj value that decreases as the range decreases. In this case, it is noted that QpAdj may take negative values.

In one example, the number of threshold values are the same (K=J) when diffBits>0 and diffBits<=0, but the individual values may or may not be same.

In one example, the number of threshold values are the same (K=J) when diffBits>=0 and diffBits<0, but the individual values may or may not be same.

In one example, even when the K threshold values are the same for both cases diffBits>0 and diffBits<=0, the associated QpAdj value for each range may or may not be the same for diffBits>0 and diffBits>=0.

In one example, even when the K threshold values are the same for both cases diffBits>=0 and diffBits<0, the associated QpAdj value for each range may or may not be the same for diffBits>=0 and diffBits>0.

4. Determine QP Value for Current Block

QP value for the current block (currQP) may be determined based on the diffBits at step 2, QpAdj calculated at step 3, and QP value used to encode the previous block (prevQP) corresponding to the same mode used to code the previous block. More precisely, the following equation is used to calculate currQP:

currQP=prevQP+QPAdj*(diffBits>0?1:−1)

In one example, currQP=prevQP+QPAdj.

In one embodiment, when a single QP is to be derived and used for all coding modes, irrespective of the coding mode of the previous block, the QP value used for encoding the previous block (prevQP) is used for the calculation of currQP.

5. Adjust QP Value for the Current Block Based on Buffer Fullness

Depending on the BF, the currQP can be further adjusted in order to avoid buffer error. More specifically, the currQP may be incremented further when the BF exceeds certain threshold; this may prevent buffer overflow. Similarly, the currQP may be decremented further when the BF is below a certain threshold which may prevent underflow.

In one implementation, rather using a single threshold value, multiple threshold values may be used. For each threshold value there is an associated value that adjusts the currQP. For example, let $[P_1, P_2, \ldots P_n]$ be n threshold values and $[p_1, p_2, \ldots p_n]$ be the respective adjustment values, and assume both are represented in monotonically decreasing order. The currQP may be adjusted as follows:

```
If(buffer fullness >= P₁)
    currQP += p₁;
else if(buffer fullness >= P₂)
    currQP += p₂;
...
else if(buffer fullness >= Pₙ)
    currQP += pₙ;
```

In one embodiment, two thresholds $P_1$ and $P_2$, and respective adjustment values $p_1$ and $p_2$ can be used.

In one implementation, greater than or equal to (>=) may be replaced with greater than (>) in the above conditions.

Similarly, $[Q_1, Q_2, \ldots Q_m]$ are m threshold values and $[q_1, q_2, \ldots q_m]$ are the respective adjustment values. Assume both are in monotonically increasing order. The currQP may be adjusted as follows:

```
If(buffer fullness <= Q₁)
    currQP −= q₁;
else if(buffer fullness <= Q₂)
    currQP −= q₂;
...
else if(buffer fullness <= Qₘ)
    currQP −= qₘ;
```

In one embodiment, two thresholds $Q_1$ and $Q_2$, and respective adjustment values $q_1$ and $q_2$ can be used.

In one implementation, less than or equal to (<=) may be replaced with less than (<) in the above conditions.

In one example, m is equal to n.

In one example, when m=n, $[Q_1, Q_2, \ldots Q_m] = [100-P_1, 100-P_2, \ldots 100-P_n]$ In one example, when m=n, $q_i$ may or may not be equal to $p_i$, for all i that take values from 1 to n.

It is noted that the selected approach to BF calculation may vary depending on the context and application.

Flatness Detection and Determining QP

In one embodiment, the steps 1-4 above may be omitted if a flatness detection algorithm detects the transition from a "complex" region of video data to a "flat" region of video data. In such cases, currQP may be set to a low value.

Depending on the BF, the currQP may be adjusted as described above, for example, with respect to step 5. More precisely, when the buffer fullness exceeds some threshold, currQP may be increased.

6. Adjust QP Value of Flat Current Block

If the visual information in the current block is "very flat" (e.g., has a high level or degree of flatness), the currQP can be further adjusted. The selected approach to calculating the complexity value of the current block $C_{cur}$ may vary depending on the context and application. If $C_{cur}$ is smaller than or smaller than and equal to a threshold, currQP may be set equal to a predetermined QP value for flat blocks, e.g., flatQp.

In one example, instead of a single threshold, multiple (e.g., L) threshold values may be used, e.g., $[T_1, T_2, \ldots T_L]$ that are arranged in monotonically increasing order. Further, for each threshold, there may be an associated QP value, [flatQp$_1$, flatQp$_2$, . . . , flatQp$_L$] that may be arranged in a monotonically increasing order. For example, the following steps may be used to determine a value of flatQp based on $C_{cur}$:

```
If(C_cur <= T_1)
    flatQp = flatQP_1;
else if (If(C_cur <= T_2)
    flatQp = flatQP_2;
...
else if (If(C_cur <= T_L)
    flatQp = flatQP_L;
```

In one embodiment, two thresholds $T_1$ and $T_2$, and respective associated QP values flatQP$_1$ and flatQP$_2$ can be used.

In one example, instead of less than or equal to (<=), less than (<) may be used in the above conditional checks.

It is noted that currQP may be set equal to flatQp. In one alternative, currQP may be determined according to: currQP=(currQP>flatQp)?flatQp: currQP.

In one example, flatQp and/or [flatQp$_1$, flatQp$_2$, . . . , flatQp$_L$] may be different for the first line in the slice when compared to the rest of the lines in the slice. This is mainly to improve the quality of the first line in the slice. Further, for a given threshold, flatQp and/or [flatQp$_1$, flatQp$_2$, . . . , flatQp$_L$] for the first line in the slice may be smaller than the rest of the lines in the slice.

In one example, [$T_1$, $T_2$, . . . $T_L$] may be different for first line in the slice compared to the rest of the lines in the slice.

Determining QP when Available Bit Budget is Low

When very few bits are left, the QP can be set to a high value, for example, a predetermined high value. In one implementation, when the condition (numSliceBitsRemaining<thresholdBits && bppRemaining<targetBpp) is true, steps 1-4 above may be omitted, and the QP may be set to a very high value. Here, thresholdBits is a variable that may be a configurable parameter, and targetBpp is the target bits per pixel and bppRemaining is calculated as: bppRemaining=numSliceBitsRemaining/numSlicePixelsRemaining.

In one example, QP may be set equal to the maximum allowed value.

Method of Determining QP in DSC

Figure 3:
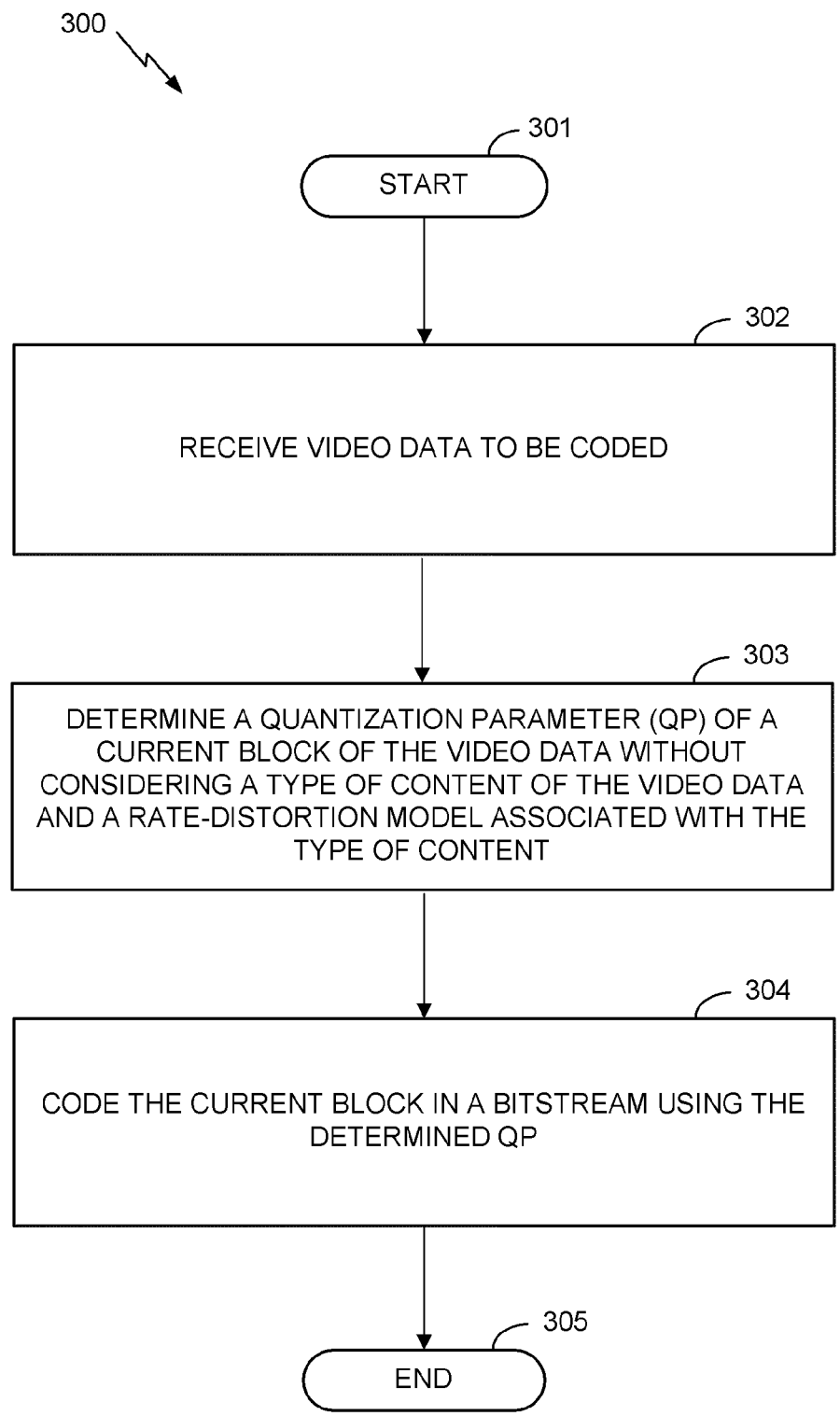
FIG. 3 is a flowchart illustrating a method for QP selection in accordance with aspects described in this disclosure.

FIG. 3 is a flowchart illustrating a process 300 for coding video data, according to an embodiment of the present disclosure. The method relates to selecting a QP. The blocks of the process 300 may be performed by a video encoder (e.g., the video encoder 20 in FIG. 2A), a video decoder (e.g., the video decoder 30 in FIG. 2B), or component(s) thereof. For illustrative purposes, the process 300 is described as performed by a video coder (also simply referred to as coder), which may be the video encoder 20, the video decoder 30, or another component. All embodiments described with respect to FIG. 3 may be implemented separately, or in combination with one another. Certain details relating to the process 300 are explained above.

The process starts at block 301. The coder can include a memory for storing video data. The memory can include a buffer. At block 302, the coder receives video data to be coded, for example, via DSC.

At block 303, the coder determines the QP of the current block of the video data without considering a type of content of the video data and a rate-distortion model associated with the type of content. The type of content of the video data may include one or more of: natural content, synthetic content, computer graphics, fractals, etc.

In one embodiment, the coder determines the QP based at least in part on (1) the difference between the bit budget for the current block and the number of bits used for encoding the previous block and (2) a first value for adjusting the QP that is a function of the difference between the bit budget for the current block and the number of bits for encoding the previous block. For example, the difference between the bit budget for the current block and the number of bits for encoding the previous block can refer to diffBits, and (2) the first value for adjusting the QP that is a function of the difference between the bit budget for the current block and the number of bits for encoding the previous block can refer to QPAdj. In one embodiment, the current block is included in a slice, and the bit budget for the current block is determined according to the equation: (a number of bits remaining for the slice/a number of pixels to be coded in the slice)*a number of pixels in the current block. The coder may determine the QP according to the equation: the QP of the previous block+the first value*(the difference between the bit budget for the current block and the number of bits used for encoding the previous block>0 ?1:−1).

In certain embodiments, the coder defines a plurality of ranges defined by two or more threshold values. Each of the plurality of ranges associated with a predetermined value. The coder determines which of the plurality of ranges includes the difference between the bit budget for the current block and the number of bits for encoding the previous block. The coder sets the first value to the predetermined value associated with the determined range. For example, the two or more threshold values and the plurality of ranges can refer to K threshold values or K+1 ranges above, and each range may be associated with a specific value for QPAdj.

In some embodiments, the coder determines the fullness of the buffer or buffer fullness. The buffer fullness can refer to BF. In one embodiment, in response to determining that the fullness of the buffer is greater than or equal to one or more threshold values, the coder adjusts the determined QP by a second value associated with the one or more thresholds. In another embodiment, in response to determining that the fullness of the buffer is less than or equal to one or more threshold values, the coder adjusts the determined QP by a second value associated with the one or more thresholds.

In certain embodiments, the coder determines the flatness of the current block. In response to determining that the flatness of the current block is greater than or equal to one or more threshold values, the coder sets the QP equal to a QP value associated with the one or more thresholds. The QP value associated with the one or more thresholds may refer to flatQP.

At block 304, the coder codes the current block in a bitstream using the determined QP. The coder may code the video data using a constant bit rate.

The process 300 ends at block 305. Blocks may be added and/or omitted in the process 300, depending on the embodiment, and blocks of the process 300 may be performed in different orders, depending on the embodiment.

Any features and/or embodiments described in this disclosure may be implemented separately or in any combination thereof. For example, any features and/or embodiments described in connection with FIGS. 1-2 and other parts of the disclosure may be implemented in any combination with any features and/or embodiments described in connection with FIG. 3, and vice versa. The embodiments of the present disclosure are not limited to or by the example shown in FIG. 3, and other variations may be implemented without departing from the spirit of this disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An apparatus for coding video data, comprising:
   a memory for storing the video data, the memory including a buffer; and
   a hardware processor operationally coupled to the memory and configured to:
     receive the video data to be coded,
     determine a difference between a number of bits allocated for coding a current block of the video data and a number of bits used for encoding a previous block of the video data,
     determine a range among a plurality of ranges within which the difference falls,
     determine an adjustment value for adjusting a quantization parameter (QP) based on the determined range,
     determine an adjusted QP of the current block based on the determined adjustment value, and
     code the current block in a bitstream using the adjusted QP.

2. The apparatus of claim 1, wherein the current block is included in a slice and the number of bits allocated for coding the current block is determined according to equation: (a number of bits remaining for the slice/a number of pixels to be coded in the slice)*a number of pixels in the current block.

3. The apparatus of claim 1, wherein the processor is configured to determine the QP of the current block according to equation: a QP of the previous block+the value associated with the determined range*(the difference between the number of bits allocated for coding the current block and the number of bits used for encoding the previous block>0?1:−1).

4. The apparatus of claim 1, wherein the plurality of ranges are defined by two or more threshold values and each of the plurality of ranges is associated with a respective adjustment value for adjusting the QP.

5. The apparatus of claim 1, wherein the processor is further configured to:
determine a fullness of the buffer; and
in response to determining that the fullness of the buffer is greater than or equal to one or more threshold values, adjust the adjusted QP by a second adjustment value associated with the one or more thresholds.

6. The apparatus of claim 1, wherein the processor is further configured to:
determine a fullness of the buffer; and
in response to determining that the fullness of the buffer is less than or equal to one or more threshold values, adjust the adjusted QP by a second adjustment value associated with the one or more thresholds.

7. The apparatus of claim 1, wherein the processor is further configured to:
determine a flatness of the current block; and
in response to determining that the flatness of the current block is greater than or equal to one or more threshold values, set the QP equal to a QP value associated with the one or more thresholds.

8. The apparatus of claim 1, wherein the processor is further configured to code the video data using a constant bit rate.

9. The apparatus of claim 1, wherein the type of content of the video data comprises one of: natural content, synthetic content, computer graphics, or fractals.

10. A method of coding video data, comprising:
storing the video data in a memory, the memory including a buffer;
receiving the video data to be coded;
determining a difference between a number of bits allocated for coding a current block of the video data and a number of bits used for encoding a previous block of the video data;
determining a range among a plurality of ranges within which the difference falls;
determining an adjustment value for adjusting a quantization parameter (QP) based on the determined range;
determining an adjusted QP of the current block based on the determined adjustment value; and
coding the current block in a bitstream using the adjusted QP.

11. The method of claim 10, wherein the current block is included in a slice and the number of bits allocated for coding the current block is determined according to equation: (a number of bits remaining for the slice/a number of pixels to be coded in the slice)*a number of pixels in the current block.

12. The method of claim 10, wherein the QP of the current block is determined according to equation: a QP of the previous block+the value associated with the determined range*(the difference between the number of bits allocated for coding the current block and the number of bits used for encoding the previous block>0?1:−1).

13. The method of claim 1, wherein plurality of ranges are defined by two or more threshold values and each of the plurality of ranges is associated with a respective adjustment value for adjusting the QP.

14. The method of claim 10, further comprising:
determining a fullness of the buffer; and
in response to determining that the fullness of the buffer is greater than or equal to one or more threshold values, adjusting the adjusted QP by a second adjustment value associated with the one or more thresholds.

15. The method of claim 10, further comprising:
determining a fullness of the buffer; and
in response to determining that the fullness of the buffer is less than or equal to one or more threshold values, adjusting the adjusted QP by a second adjustment value associated with the one or more thresholds.

16. The method of claim 10, further comprising:
determining a flatness of the current block; and
in response to determining that the flatness of the current block is greater than or equal to one or more threshold values, setting the QP equal to a QP value associated with the one or more thresholds.

17. The method of claim 10, further comprising coding the video data using a constant bit rate.

18. The method of claim 10, wherein the type of content of the video data comprises one of: natural content, synthetic content, computer graphics, or fractals.

19. A non-transitory computer readable medium comprising instructions that when executed on a processor comprising computer hardware cause the processor to:
store the video data in a memory, the memory including a buffer;
receive the video data to be coded;
determine a difference between a number of bits allocated for coding a current block of the video data and a number of bits used for encoding a previous block of the video data;
determine a range among a plurality of ranges within which the difference falls;
determine an adjustment value for adjusting a quantization parameter (QP) based on the determined range;
determine an adjusted QP of the current block based on the determined adjustment value; and
code the current block in a bitstream using the adjusted QP.

20. The computer readable medium of claim 19, wherein the instructions further cause the processor to determine the QP of the current block according to equation: a QP of the previous block+the value associated with the determined range*(the difference between the number of bits allocated for coding the current block and the number of bits used for encoding the previous block>0?1:−1).

21. The computer readable medium of claim 19, wherein the plurality of ranges are defined by two or more threshold values and each of the plurality of ranges is associated with a respective adjustment value for adjusting the QP.

22. The computer readable medium of claim 19, wherein the type of content of the video data comprises one of: natural content, synthetic content, computer graphics, or fractals.

23. An apparatus for coding video information, comprising:
means for storing the video data in a memory, the memory including a buffer;
means for receiving the video data to be coded;
means for determining a difference between a number of bits allocated for coding a current block of the video data and a number of bits used for encoding a previous block of the video data;
means for determining a range among a plurality of ranges within which the difference falls;
means for determining an adjustment value for adjusting a quantization parameter (QP) based on the determined range;

means for determining an adjusted QP of the current block based on the determined adjustment value; and means for coding the current block in a bitstream using the adjusted QP.

24. The apparatus of claim 23, wherein the means for determining the QP is further configured to determine the QP of the current block according to equation: a QP of the previous block+the value associated with the determined range*(the difference between the number of bits allocated for coding the current block and the number of bits used for encoding the previous block>0?1:−1).

25. The apparatus of claim 23, wherein the plurality of ranges are defined by two or more threshold values and each of the plurality of ranges is associated with a respective adjustment value for adjusting the QP.

26. The apparatus of claim 23, wherein the type of content of the video data comprises one of: natural content, synthetic content, computer graphics, or fractals.

* * * * *